United States Patent Office 2,993,041
Patented July 18, 1961

2,993,041
ALKALI-METAL PHOSPHATE-MODIFIED STARCHES
Jacob W. Sietsema, Northbrook, and William C. Trotter, Evanston, Ill., assignors to International Minerals & Chemical Corporation, a corporation of New York
No Drawing. Filed Jan. 31, 1957, Ser. No. 637,351
10 Claims. (Cl. 260—233.5)

The present invention relates to modified starches. More particularly, it relates to phosphate-modified starches of increased viscosity and to a method for the preparation thereof.

Starch is a well-known article of commerce which is used as an additive in numerous compositions for the purpose of modifying the physical properties thereof—for example, the properties of adhesiveness, water retention, viscosity, gelation, and the like. In food products, starch acts as a thickener, a stabilizer, a binder, or an extender. In textiles, it is employed as a fiber coating; in paper, as a sizing agent; and in ore flotation, as a slime inhibitor. Numerous other uses are described in the art.

In many applications, it is desirable to modify the properties of starch and thereby to adapt it more precisely to the desired use. To this end, it is sometimes desirable to treat starch with a phosphorylating agent (e.g., phosphorus oxychloride in the presence of pyridine), and thereby to produce a phosphate-modified starch having improved water-solubility and stability. The present invention, in one aspect, is a method for further treating phosphate-modified starches whereby compositions are obtained having substantially increased viscosities in aqueous solution.

One object of the present invention is to purify and upgrade phosphate-modified starches.

Another object is to provide a phosphate-modified starch of increased viscosity in aqueous solution.

These and other objects of the invention will be apparent from the following description and claims.

The preparation of a phosphate-modified starch is described by Hans Neukom in copending applications Serial No. 378,666, filed September 4, 1953, now U.S. Patent No. 2,884,412 and Serial No. 456,621, filed September 16, 1954, now U.S. Patent No. 2,865,621. In the Neukom method, starch is impregnated with a solution of a phosphate salt, then heated to an elevated temperature at which the substances react in a way not well understood, producing desirable changes in the properties of the starch. The resulting composition is a preferred starting matter in the process of our invention.

In accordance with our invention, a phosphate-modified starch is dissolved in water, and is then precipitated therefrom by addition of an oxygen-containing water-miscible organic liquid, such as methanol, acetone, or the like, as will be more fully illustrated hereinafter. The precipitate is separated from the liquid phase, and preferably dried. The resulting solid is the improved composition of our invention. It contains a decreased proportion of inorganic phosphates, color bodies, and other impurities, and aqueous solutions thereof are substantially higher in viscosity than solutions of the prior-art materials.

In preparing the phosphate-modified starches of Neukom, starch is heated at a temperature between about 120 and about 175° C. with certain phosphate salts. In one representative method, dry, ungelatinized starch is immersed in an aqueous solution of an alkali-metal orthophosphate, the liquid phase is removed, and the resulting mixture is heated for around 1 to 15 hours at about 130 to 170° C., preferably about 5 hours at about 160° C., the length of the heating period varying inversely with the temperature. A cold-water-soluble starch is obtained thereby having a viscosity between about 1000 and about 5000 cp., measured in 5% aqueous solution at room temperature.

Preferred phosphate salts are sodium, potassium, and lithium orthophosphates, alone or in suitable combinations to yield a pH in aqueous solution between about 4 and about 7, preferably around 6, measured at 25° C. at the concentration employed. For example, monosodium orthophosphate and disodium orthophosphate are combined in aqueous solution in such proportions as to produce a pH between about 6 and about 7. Or the desired salts may be formed in situ, for example by dissolving trisodium orthophosphate or other basic phosphate salt in water and adjusting the pH of the soution to the desired level by adding orthophosphoric acid or an acidic orthophosphate salt. Alternatively, orthophosphoric acid or an acidic phosphate salt in aqueous solution may be adjusted upward to the desired pH by adding an alkali-metal hydroxide or a basic alkali-metal orthophosphate salt.

The phosphate solution may suitably be between about 1 and about 3 molar in phosphate and should be used in a quantity equivalent to at least about 1% by weight of phosphorus, preferably between about 3 and about 5%, based on the quantity of starch to be treated. The quantity and concentration of solution should be chosen so that the starch will form a slurry when commingled therewith. The quantity of starch will generally be less than 1.5 times the weight of the water contained in the solution, and will preferably be less than the weight of water. The slurry should be agitated or stirred for 5 to 10 minutes or more to permit the starch granules to become soaked with the solution.

The soaked starch granules are separated from the solution by filtration, centrifugation, or the like, and the liquid phase is largely removed, suitably by air drying at a temperature below the point at which starch gelatinizes, e.g., below about 60 to 80° C., depending upon the particular starch. The resulting granules, which generally contain between about 8 and about 15% of water, are subjected to a heat treatment as set forth hereinabove. The heat-treated material is a phosphate-modified starch suitable for use as the starting material in our invention.

In carrying out our invention, a quanitiy of phosphate-modified starch is dissolved in water in a proportion between about 1 and about 15% by weight or higher up to the saturation level, based upon the quantity of water employed. The higher the viscosity of the starting material, the lower the preferred concentration thereof. When the starting material is in the form of a dry powder, it tends to cake when added to water; this can be prevented by first wetting it with a small quantity of an organic liquid of the type thereafter to be used as precipitant from the aqueous solution. To the starch-containing aqueous solution is added a quantity of an oxygen-containing water-miscible organic liquid to precipitate the phosphate-modified starch in purified form. The precipitation is carried out at a temperature between about 10 and about 75° C. and below the gelatinization point of the composition being treated, preferably between about 20 and about 30° C. The proportion of added organic liquid should be great enough to produce an effective precipitation of a phosphate-modified starch fraction of high viscosity, but not high enough to precipitate unbound inorganic salts, low-viscosity starch fractions, or other substances. We have observed that the proportion of added organic liquid should be at least about 35% by volume, based on the total volume of liquids present in the solution, and should be less than about 65% by volume. We prefer to employ between about 50 and about 65% by volume for best results in terms of filterability, product viscosity, and product recovery. The precipitation is quite rapid; so that as soon as the materials have been thoroughly mixed, the solids may be separated by filtration, centrifugation, or the like. The solids, of course, contain a quantity of the organic precipitating liquid, which must ordinarily be removed for many product applications (e.g., in food). This is best done by further washing the solids with anhydrous organic liquid to remove the water contained therein, then drying, suitably in air, and preferably at a temperature not exceeding about 80° C. The removal of the water prior to drying is desirable to avoid hydrolysis, saponification, gelatinization, or other side reactions during the drying operation. In many applications, the organic liquid need not be removed, and the wet solids can be used without further treatment. In either event, the precipitate is a phosphate-modified starch of reduced content of unbound phosphate salt, better color, easier dispersibility, and substantially higher viscosity compared with the starting material—ordinarily about 4,000 cp. or higher in 5% aqueous solution at room temperature, depending upon the grade of the starting material.

In a preferred embodiment of the invention, the precipitation of phosphate-modified starch as described above is carried out two, three, or more times on a given batch of the starting material in order to effect further purification and viscosity increase. In such repetitive treatment, the precipitate from the prior step may conveniently be redissolved in water without an intermediate washing operation, drying, or prewetting with organic liquid.

For reasons which are not apparent, we find that the aqueous solution of phosphate-modified starch, prior to precipitation, is advantageously allowed to stand for a period of around 2 to 24 hours, optimally around 12 hours. A substantially more viscous product is ordinarily obtained from solutions which have been allowed to age in this way.

The organic liquid employed in our invention for precipitating purified phosphate-modified starch from aqueous solution is an oxygen-containing, water-miscible organic liquid which is inert toward the contents of our purification medium under the conditions employed. Such substances, when employed in the proportions defined above, are antisolvents for high-viscosity phosphate-modified starches, but not for low-viscosity phosphate-modified starches or unbound inorganic phosphates and other salts. Suitable precipitants include acetone, dioxane, tetrahydrofurfuryl alcohol, the water-miscible aliphatic monohydric alcohols, e.g., methanol, ethanol, n-propyl alcohol, and isopropyl alcohol; the water-miscible aliphatic polyhydric alcohols, such as ethylene glycol, propylene glycol, glycerol and the like; the water-miscible aliphatic ether-alcohols, such as ethylene glycol methyl ether and diethylene glycol ethyl ether; the water-miscible glycol diethers, such as diethylene glycol diethyl ether; and the like.

Our compositions may be bleached if desired by treatment, preferably prior to precipitation, with a mild oxidizing agent such as bleaching powder or chlorine. Any excess of bleaching agent can be removed by treatment with sodium bisulfite or other mild reducing agent.

The following specific example will more fully illustrate our invention:

Example

Distilled water (765 grams) was heated to 40–50° C., and in it were dissolved $NaH_2PO_4 \cdot H_2O$ (128.5 grams) and $Na_2HPO_4 \cdot 7H_2O$ (489.5 grams). The resulting solution, having a pH of 6.5, was commingled with wheat starch (455 grams) and admixed 0.5 hour at 40–50° C. The mixture was filtered and dried for 16 hours in an oven at an air temperature of 70–80° C. The dried material, containing 1.28% by weight of water, was heated with stirring to 160° C. and held at this temperature for about 6 hours. The resulting crude starch phosphate had a viscosity of 3600 cp. in 5% aqueous solution at room temperature.

A 15-gram portion of the crude starch phosphate, prepared as described above, was wetted with a small quantity of methanol and dissolved in 300 milliliters of water. Into the solution were slowly stirred 900 milliliters of methanol. The resulting precipitate was filtered off, washed with 200 milliliters of methanol, and dried 2 hours in an oven at an air temperature around 80° C. The product had a viscosity of 4200 cp. in 5% aqueous solution at room temperature.

The above product was wetted with methanol and redissolved in 300 milliliters of water, then precipitated with 800 milliliters of methanol, filtered, washed with 200 milliliters of methanol, and dried. The retreated product had a viscosity of 31,200 cp. in 5% aqueous solution at room temperature.

The retreated product was wetted with methanol and redissolved in 250 milliliters of water, then allowed to stand about 16 hours at room temperature. The starch phosphate was thereafter precipitated with 325 milliliters of methanol, filtered, washed with 300 milliliters of methanol, and dried. The final product had a viscosity of 80,000 cp. in 5% aqueous solution at room temperature.

All viscosity measurements described herein were made on 5% aqueous solutions at room temperature (about 25° C.) with a Brookfield "Synchro-Lectric" viscometer manufactured by Brookfield Engineering Laboratories, Cushing, Mass., employing spindles and speeds as follows:

| Viscosity Range, cp. | Spindle No. | Speed, r.p.m. |
| --- | --- | --- |
| 0–10,000 | 3 | 12 |
| 10,000–50,000 | 4 | 12 |
| 50,000–100,000 | 4 | 6 |

The process of our invention is applicable broadly to the treatment of phosphate-modified starches, including those prepared from potato starch, corn starch, wheat starch, cassava starch, arrowroot starch, and the like, and the acid-modified, oxidized, cross-linked, or otherwise modified derivatives thereof, so long as such derivatives retain the essential characteristics of the starch molecule. These modified starches ordinarily contain between about 1 and about 5% by weight of bound phosphorus based on the weight of dry starch and about 1 to about 1.75 moles of bound alkali metal per mole of bound phosphorus, preferably between about 3 and about 5% of phosphorus and between about 1.4 and about 1.7 moles of alkali metal.

The process of our invention results in a substantial increase in the viscosity of solutions of the phosphate-modified starches of the prior-art. By means of our invention we have succeeded in preparing phosphate-modified starches having a viscosity as high as 100,000 cp. in 5% aqueous solution at room temperature. We can readily prepare modified starches having viscosities in the range of 10,000 to 50,000 cp., and we find that virtually any starting material of the defined class can be increased in viscosity by 1000 cp. or more by a single treatment in accordance with our invention.

Our products are especially useful as thickening agents in food products, such as soups, ice creams, puddings, salad dressings, mayonnaise, pie fillings, and the like. They are also useful as sizing agents in the surface finishing of paper, as beater additives in paper making prior to paper mat formation, as inhibitors of water loss in oil well drilling muds, as core binders in the preparation of foundry cores, and as desliming agents in potash ore flotation.

The phosphate-modified starches form clear dispersions in water which are more or less viscous, depending upon the concentration, and which are believed to be more or less colloidal in nature. Such dispersions are uniformly referred to herein for convenience as "solutions," i.e., colloidal solutions, and it is to be understood that we do not thereby intend to imply that the dispersions are true solutions.

While we have described our invention with reference to specific starting materials, process steps, operating conditions, manipulative details, and products, it is to be understood that such matters are illustrative only and not by way of limitation. Numerous modifications and equivalents of the invention will be apparent from the foregoing description to those skilled in the art.

In accordance with the foregoing description, we claim as our invention:

1. A process for treating an alkali-metal phosphate-modified starch and separating therefrom an alkali-metal phosphate-modified starch fraction of increased viscosity when dispersed in water, said modified starch having been obtained by reaction of starch with an alkali-metal orthophosphate at a temperature between about 120 and about 175° C., which comprises dispersing said alkali-metal phosphate-modified starch in water, adding to the resulting dispersion an inert oxygen-containing water-miscible organic liquid selected from the group consisting of alcohols, ketones, and ethers and mixtures thereof in a proportion sufficiently high to precipitate an alkali-metal phosphate-modified starch fraction of higher viscosity in aqueous dispersion than the original material while retaining unbound inorganic salts and lower-viscosity starch fractions in the dispersed state, and separating the precipitate from the resulting slurry.

2. A process wherein an alkali-metal phosphate-modified starch is subjected to a multiplicity of dispersing and precipitating steps as in claim 1.

3. A process as in claim 1 wherein said dispersion of said alkali-metal phosphate-modified starch in water is allowed to stand for a period of about 2 to about 24 hours before addition of said organic liquid.

4. A process for treating an alkali-metal phosphate-modified starch and separating therefrom an alkali-metal phosphate-modified starch fraction of increased viscosity when dispersed in water, said modified starch having been obtained by soaking starch in an aqueous solution of an alkali-metal orthophosphate, separating the starch from said solution, drying the starch to a water content below about 15% at a temperature below the point at which starch gelatinizes, and heating the dried starch at a temperature between about 130 and about 170° C. for around 1 to 15 hours, which process comprises dispersing said alkali-metal phosphate-modified starch in water, adding to the resulting dispersion a water-miscible aliphatic monohydric alcohol in a quantity sufficient to produce a mixed solvent containing between about 35 and about 65% by volume of said alcohol, whereby a precipitate of purified alkali-metal phosphate-modified starch is produced, having a higher viscosity in aqueous dispersion than the original material, while unbound inorganic salts and lower-viscosity starch fractions are retained in the dispersed state, and separating the precipitate from the resulting slurry.

5. The process of claim 4 wherein said alcohol is methanol.

6. The process of claim 4 wherein said alcohol is ethanol.

7. The process of claim 4 wherein the proportion of said alcohol in said mixed solvent is between about 50 and about 65% by volume.

8. The process of claim 4 wherein said precipitation of purified alkali-metal phosphate-modified starch is effected at a temperature between about 10 and about 75° C.

9. The process of claim 4 wherein said precipitation of purified alkali-metal phosphate-modified starch is effected at a temperature between about 20 and 30° C.

10. A process for preparing an improved alkali-metal phosphate-modified starch, which comprises preparing an aqueous dispersion containing between about 1 and about 15% by weight of an alkali-metal phosphate-modified starch, said modified starch having been obtained by soaking starch in an aqueous alkali-metal orthophosphate solution having a concentration between about 1 and about 3 molar in phosphate and a pH between about 6 and about 7, separating the starch from said solution, drying the starch at a temperature below about 60° C. to a water content between about 8 and about 15%, and heating the dried starch at a temperature around 160° C. for about 5 hours; commingling said aqueous dispersion of said modified starch with methanol in a quantity sufficient to produce a mixed solvent containing between about 50 and 65% by volume of methanol, whereby a precipitate of purified alkali-metal phosphate-modified starch is produced, having a higher viscosity in aqueous dispersion than the original material, while unbound inorganic salts and lower-viscosity starch fractions are retained in the dispersed state, and recovering said precipitate from the resulting slurry.

References Cited in the file of this patent

UNITED STATES PATENTS

| | | |
|---|---|---|
| 2,171,796 | Kelling | Sept. 5, 1939 |
| 2,252,479 | Beyer | Aug. 12, 1941 |
| 2,280,723 | Schock | Apr. 21, 1942 |
| 2,328,537 | Felton | Sept. 7, 1943 |
| 2,575,352 | Lohmar | Nov. 20, 1951 |
| 2,590,912 | Yarber | Apr. 1, 1952 |
| 2,614,945 | Krisan | Oct. 21, 1952 |
| 2,686,779 | Jones | Aug. 17, 1954 |
| 2,806,026 | Evans | Sept. 10, 1957 |
| 2,865,762 | Neukom | Dec. 23, 1958 |
| 2,884,412 | Neukom | Apr. 28, 1959 |

OTHER REFERENCES

Chemistry of The Carbohydrates, by William Ward Pigman and Rudolph Goepp, Jr., Academic Press Inc., N.Y., 1948, pages 565–572.

Industrial and Engineering Chemistry, article by Wolff, vol. 46, No. 2, February 1954, pages 370–376.

Starch and Its Derivatives, by Radley, 3rd Ed., vol. 1, John Wiley and Sons, Inc., N.Y., 1954, pp. 155–157.

Chemistry and Industry of Starch, by Kerr, 2nd Ed., Academic Press Inc., publ. N.Y.C., pp. 185–195.